Figure 1:
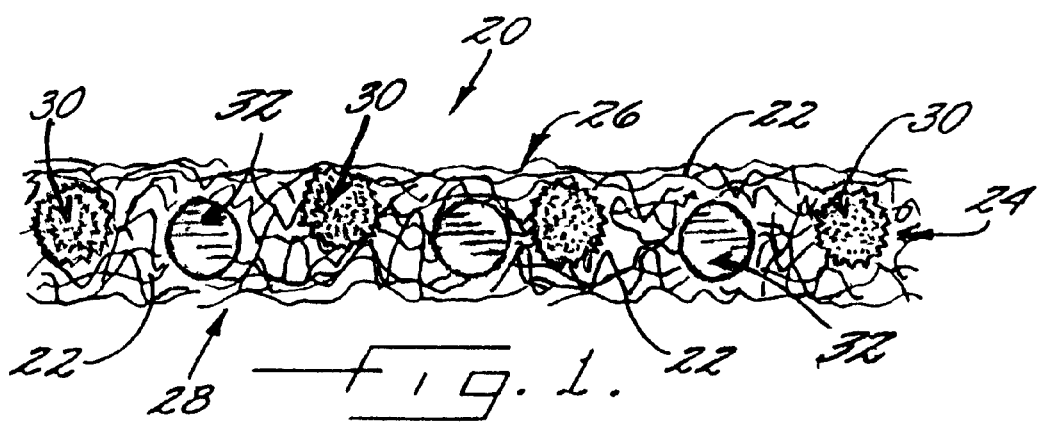
Figure 2:
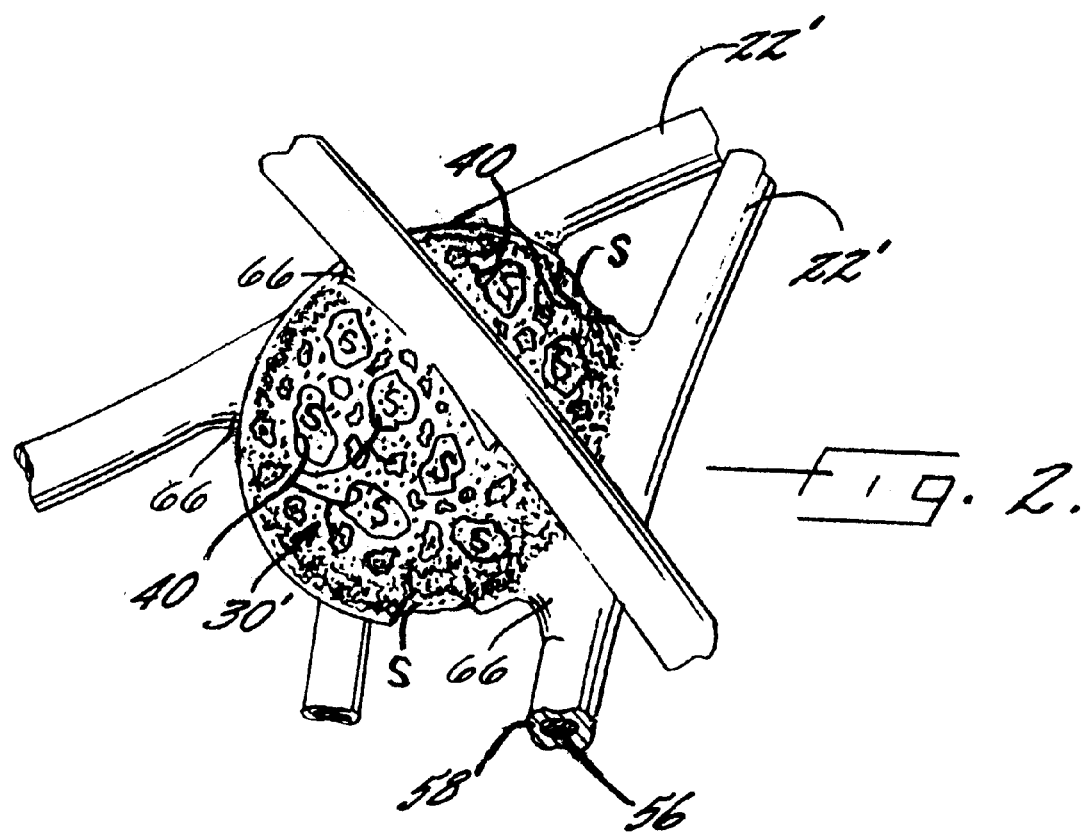

United States Patent [19]
Groeger et al.

[11] Patent Number: 5,952,092
[45] Date of Patent: Sep. 14, 1999

[54] FIBROUS STRUCTURES WITH LABILE ACTIVE SUBSTANCE

[75] Inventors: H. Gunter Groeger, Charlotte; Jason R. Malone, Matthews, both of N.C.

[73] Assignee: AQF Technologies LLC, Charlotte, N.C.

[21] Appl. No.: 08/791,681

[22] Filed: Jan. 30, 1997

Related U.S. Application Data

[51] Int. Cl.[6] ........................................................ B32B 5/16
[52] U.S. Cl. ........................ 428/323; 156/62.2; 156/62.6; 428/304.4; 428/307.3; 428/307.7; 428/327; 428/357; 442/375; 442/417
[58] Field of Search ...................................... 442/417, 375; 428/323, 357, 327, 304.4, 307.3, 307.7; 156/62.2, 62.6

[56] References Cited

U.S. PATENT DOCUMENTS

| | | | |
|---|---|---|---|
| 5,145,820 | 9/1992 | Liang et al. | 502/401 |
| 5,346,876 | 9/1994 | Ichimura et al. | 502/417 |
| 5,462,908 | 10/1995 | Liang et al. | 502/401 |
| 5,486,410 | 1/1996 | Groeger et al. | 428/408 |
| 5,605,746 | 2/1997 | Groeger et al | 442/347 |
| 5,674,339 | 10/1997 | Groeger et al. | 156/145 |
| 5,736,473 | 4/1998 | Cohen et al. | 442/239 |

OTHER PUBLICATIONS

Biopore Technology Report, No. 1, Jan. 1997, Biopore Corporation.

*Primary Examiner*—James J. Bell
*Attorney, Agent, or Firm*—Timothy R. Kroboth

[57] ABSTRACT

A fibrous structure comprising a fibrous matrix with immobilized surrogate particles, is provided. A labile active substance is selectively deposited on the immobilized surrogate particles. In one embodiment, the surrogate particles are porous and have surface cavities, and the labile active substance is deposited in the pores and surface cavities. In another embodiment, the labile active substance is in attractive association with or attached to the surrogate particles.

20 Claims, 1 Drawing Sheet

FIBROUS STRUCTURES WITH LABILE ACTIVE SUBSTANCE

FIELD OF THE INVENTION

This invention relates to a fibrous structure with immobilized particles.

BACKGROUND OF THE INVENTION

Particulate carriers for sorptive impregnants are known. Exemplary are conventional relatively thermostable, sorptive impregnants such as copper and silver salts, on activated carbon particles. Also known are liquid sorptive impregnants such as liquid amines, on particulate carriers. Illustrative are U.S. Pat. Nos. 5,145,820 and 5,462,908 to Liang et al, which describe the deposition of liquid sorptive amines on activated carbon particles by reduced pressure sublimation.

Fibrous structures containing adsorptive particles are commercially available. Filter media or filters made from these structures include sorptive particles for selectively removing certain components of a liquid or gas passing through the filter. Acceptable performance with low pressure drop beneficially results from the sorptive particles being distributed in a three dimensionally spaced apart arrangement and being immobilized in this arrangement. However, the immobilizing step can be detrimental to sorptive particles. For example, physical immobilization techniques such as needling and water jet entangling, can adversely affect sorptive particles.

On the other hand, if heat-bonding is used for immobilizing the sorptive particles, the elevated temperature applied for the bonding could be harmful. Furthermore, chemically aggressive particles could adversely affect the fibrous structure during an elevated heat-bonding step. In addition, moisture in active particles can interfere with heat-bonding. Moreover, there is difficulty in regenerating the functional activity of a fibrous structure having active particles bonded to the fibrous structure.

Accordingly, despite prior advances in this art, an improved fibrous structure having a three dimensional arrangement of immobilized active material, is needed. Such a fibrous structure could beneficially include active material adversely affected by an immobilization step. Furthermore, such a fibrous structure could advantageously include chemically aggressive, active material. In addition, such a fibrous structure would facilitate the recovery and safe disposal of spent active material, and the regeneration of the functional activity of the fibrous structure.

SUMMARY OF THE INVENTION

In accordance with the present invention, an improved fibrous structure is beneficially based upon a fibrous matrix and surrogate particles supported by the fibrous matrix. By "surrogate particles" is meant particles that function as a carrier for an active substance. The surrogate particles may be porous and may have surface cavities.

In accordance with the invention, the surrogate particles are beneficially distributed in a three dimensional arrangement and immobilized. Advantageously, the fibrous matrix is generally uniform in structure, and the three dimensional arrangement is also generally uniform.

In accordance with the invention, a labile active substance is carried by the surrogate particles, and there is selective deposition of the labile active substance on the surrogate particles. The selective deposition can be based upon features such as the physical structure of the surrogate particles, or an attractive association or an attachment of the labile active substance to the surrogate particles. Thus, for example, an active substance sensitive to thermally-effected, surrogate particle immobilization, may be selectively deposited on the surrogate particles after surrogate particle immobilization by heat-bonding.

The labile active substance may be merely deposited on, or may be in attractive association with or attached to, the surrogate particles. If in attractive association or attached, the attraction or attachment may be reversible so that spent labile active substance can be recovered without affecting the surrogate particles/fibrous structure, and the activity of the fibrous structure may thereafter be regenerated. The labile active substance selected may provide the fibrous structure with a purifying or odorizing activity, processing benefits, or analytical uses.

BRIEF DESCRIPTION OF THE DRAWING

Reference is now made to the accompanying drawing, which is highly illustrative, and forms a part of the specification of the present invention.

FIG. 1 is a sectional view depicting a fibrous structure having immobilized particles, in accordance with the invention; and FIG. 2 is an enlarged view of an immobilized surrogate particle having surface cavities and pores, and entrapped within an interstitial space of, and bonded to fibers of, a fibrous structure similar to that of FIG. 1.

DETAILED DESCRIPTION OF THE INVENTION

As indicated above, the fibrous structure of the present invention is advantageously based upon a fibrous matrix with surrogate particles distributed and immobilized in a three dimensional arrangement. Such a structure will be typically non-woven, and may be made using composite fibers, a mixture of structural fibers and fusible fibers, powder bonding, or using other suitable approaches for bonding the surrogate particles to the fibrous structure. Immobilization of the surrogate particles may also be accomplished by physical techniques such as needling and water jet entangling.

In any event, the fibrous matrix will include a structural fibrous component, and beneficially the structural component will provide structural integrity even when the fibrous matrix is highly loaded with the surrogate particles. If heat is used for immobilizing the surrogate particles, the bonding temperature will typically be an elevated temperature in the range of from about 130 to 200° C., although an elevated temperature outside this range may be appropriate depending upon factors including the specific material for bonding the surrogate particles to the fibrous matrix.

To provide for point-of-contact bonding of the surrogate particles to the fibrous matrix, the fibrous matrix is preferably formed from composite fibers having a structural fiber component and a heat-bondable fiber component. Generally speaking, the structural component will typically melt at a temperature at least about 30 to 50° C. higher than the heat-bondable component. Preferably, the heat-bondable fiber component has high bonding capability for bonding the surrogate particles to the fibrous matrix. The bonding is preferably achieved by heating a heat-bondable, polymeric fiber component to a temperature at which it is tacky or molten, but in any event provides for adhesion. Beneficially, the heating will also provide for stabilization of the web structure by fiber-fiber bonding at the cross over points of fibers. A "spot weld" is produced by adhesion at the point of contact of individual surrogate particles with individual matrix fibers. Point-of-contact bonding advantageously minimizes undesirable coating of the surrogate particles by the bonding material.

Concentric sheath-core fibers are one example of useful composite fibers. Suitable composite fibers also include eccentric sheath-core fibers, and fibers having a side-by-side configuration. Composite fibers of these types are known as bicomponent or heterofil fibers. One skilled in the art will recognize that a variety of multiconstituent fiber structures having a lower melting component exist or may be made, and will recognize that those multiconstituent fiber structures may be selected from, as useful composite fibers.

Useful fibers may be in a variety of forms including crimped and non-crimped cut staple fibers, shortcut staple, continuous filaments, and blends thereof. Advantageously, a non-woven web structure in accordance with the invention, may be dry-formed from crimped, staple fibers so as to be lofty. In addition, spunbond web structures and melt blown web structures may be used.

The structural fibers should be present in an amount sufficient to provide a matrix structure and ample surface area for immobilization of the surrogate particles. Typically, the fibrous matrix will be present in a minor amount compared to the loading of the surrogate particles. Although a fibrous web including surrogate particles may include from about 5% to 80% by weight of structural fiber, usually only about 10 to 25 wt. % will be structural fiber unless low density surrogate particles are used.

The matrix structure will preferably be generally uniform to assist in a preferred, three dimensionally generally uniform distribution and spacing of the surrogate particles, with adequate void space. In addition to promoting generally uniform application and deposition of the active substance on the surrogate particles, this benefits accessibility of the deposited active substance to a liquid or gas. Tortuous flow paths may be provided by the three dimensionally spaced apart arrangement of the surrogate particles.

An open, generally uniform, non-woven web structure in accordance with the invention, may be beneficially dry-formed from crimped, staple macrofiber having an average diameter in excess of about 10 microns. The average diameter will typically range from about 12 to 25 microns depending upon the intended application. If desired, structural fibers of significantly different diameters may be combined to form the fibrous matrix.

For dry lay processing, the structural fiber will generally have a length to diameter ratio that is limited on the low side. On the high side, continuous length fiber may be used. For wet lay processing, if used, an appropriate length to diameter ratio of the structural fiber will be selected.

Useful fibrous structures can be built to thicknesses of from about 0.5 to 50 mm. However, if desirable depending upon considerations including the end use, much thicker structures can be made. Stacked fibrous structures can be made.

The fibrous matrix may also include a structurally beneficial amount of stiffening fibers having a denier per filament of from 6 to 10,000 especially if the surrogate particles are relatively large in size. In addition, the fibrous matrix may include microdenier fibers for removal of relatively smaller particles from a gas or liquid. These stiffening fibers or microdenier fibers may be composite or non-composite fibers or a blend thereof. The fibrous matrix may include other fibers or filament or fibrets, depending upon the result desired.

The surrogate particles may be any particles, organic or inorganic, suitable as a carrier for an active substance. Useful surrogate particles advantageously include structural features that assist the deposition of the active substance, and in particular selective deposition on the surrogate particles vis-a-vis the fibrous matrix. Exemplary are porous particles, and particles having a rough or irregular surface providing surface cavities or recesses. As illustrated in FIG. 2, useful surrogate particles may be porous and have surface cavities. The surrogate particles may have a useful functional activity such as sorptive activity, but to be useful in this invention, it is not necessary that the surrogate particles function other than as a carrier for the active substance. Also, it is not necessary that useful surrogate particles be porous or have surface cavities. Exemplary surrogate particles include carbon particles such as activated carbon, zeolite particles, alumina particles such as activated alumina, polymeric particles including, for example, styrene monomer, and absorbent particles such as commercially available superabsorbent particles. Useful porous polymeric particles advantageously have void volumes greater than about 50%, beneficially of about 60 to 65% or more. Particularly suitable polymeric particles are available from Biopore Corporation under the trademark MAGNAPORE, and are low density particles with void volumes greater than 70%, typically about 90% or more, and have cavities ranging in diameter from about 1 to 100 microns, and interconnected by pores. The foregoing description is intended to be representative of and not in limitation of particles suitable for use as surrogate particles in the practice of the present invention.

In accordance with the invention, the surrogate particles are immobilized. Heat-bonding beneficially limits migration of the surrogate particles within the structure, as well as loss from the structure. Bonding of individual surrogate particles to the fibrous matrix at more than one point is advantageous. Heat-bonding may be achieved by, for instance, the addition to the fibrous web of surrogate particles heated to an appropriate elevated temperature, or by heating the web to an appropriate elevated temperature after the surrogate particles have been added to the web. The immobilized surrogate particles may be only on the web surface, or within the web, or on the web surface and within the web.

The surrogate particles will typically have an average size in the range of from about 10 microns, typically about 100 microns, to about 3 mm to 5 mm, may be in the form of beads, granules and so forth, and may vary in shape from spheroidal particles to irregularly shaped particles. Generally speaking, the surrogate particles have an appropriate size to be entrapped by the web structure. However, the surrogate particles may also be deposited by being preheated to an elevated temperature.

The surrogate particles may be elongated, and more particularly may be in the form of fibers, in particular synthetic fibers, having longitudinally disposed surface channels for the selective deposition of the active substance. If in the form of fibers, the surrogate particles will be physically distinct from the structure-forming fibers of the fibrous matrix.

The fibrous matrix may be loaded with about 20% to 95% by weight of the surrogate particles, based on the combined weight of the surrogate particles and of the matrix fiber. In selecting the loading, consideration should be given to providing adequate surface area for deposition of the labile active substance. Because the surface area of a particle depends not only upon the density of the particle, a higher weight percent loading of one type of surrogate particle than another type of surrogate particle, would not necessarily result in more surface area for deposition. Thus, a high loading of low density surrogate particles could result in adequate surface area for deposition, yet constitute only a low weight percent, for instance, 25 wt. %. If surrogate particles similar in density to activated carbon or zeolite or alumina are chosen, the fibrous matrix will typically be loaded with about 50% to 90% by weight of the surrogate particles, depending, of course, upon in particular the surface area requirements for deposition. Generally speaking, a relatively higher volume of the fibrous matrix occupied by the surrogate particles, will provide for tortuous flow paths in the fibrous matrix.

In accordance with a benefit of the invention, the active substance carried by the surrogate particles, may be a labile active substance. Although a variety of active substances having a useful function may be used, a beneficial labile active substance will typically function in a fibrous structure in accordance with the invention, to remove certain components or undesirable contaminants from, or be released into, a gas or liquid; or to act upon the gas or liquid or a component or components thereof with which the labile active substance is in contact, to produce a useful processing effect such as an alteration, change or chemical modification; or to analyze the gas or liquid, or effect a useful separation. If released, the release will usually be at a desirably slow rate from the surrogate particles. Useful processing effects include killing or inactivating or attenuating harmful bacteria and viruses, and chemically modifying undesirable inorganic contaminants. Useful analyses include diagnostic tests. The function of the labile active substance may be enhanced by functional activity of the surrogate particles or by functional activity of another substance or material. The labile active substance will be selected depending upon the end use or functional activity desired.

Prior to deposition on the surrogate particles, the labile active substance may be in solid, liquid or vapor form. The term "labile" excludes relatively stable substances such as conventional copper, zinc and silver sorptive impregnants. A useful labile active substance will generally be functionally labile or associatively labile. By "functionally labile" is meant sensitive to loss or diminution of the useful function; and by "associatively labile" is meant volatile, sublimable, or otherwise subject to loss from the surrogate particles to the atmosphere. Lability may be caused by the application of elevated heat, that is, heat in excess of about 100° C. Lability may relate to the physical form in which the active substance is carried, for instance, as a liquid. Lability may result from the manner in which the active substance is carried by the surrogate particles, or may result from or be caused by other factors. A thermolabile active substance may be sensitive to heat-bonding of the surrogate particles to a fibrous matrix, as a result of being functionally labile or associatively labile.

Exemplary labile active substances include liquid and solid, organic and inorganic compounds such as potassium permanganate, activated manganese dioxide, alkali metal and alkaline earth metal iodates, sorptive organic amines, substances intended to be released such as fragrances, biocides, and labile catalysts and other processing and analytical agents. Useful sorptive organic amines include substituted liquid amines such as aliphatic primary, secondary and tertiary amines. Exemplary sorptive organic amines include diethylenetriamine, ethylenediamine, triethylenediamine, isopropylamine, diisopropylamine, piperidine, dipropylamine, triethylamine and triisobutylamine. Another useful liquid is polyethyleneglycoldimethylether, which is commercially available from Hoechst of Germany. Absorbent surrogate particles, or surrogate particles having surface cavities or pores, or having pores and surface cavities, are especially useful as carriers of liquid active substances. Thus, superabsorbent particles and elongated particles having longitudinal surface channels may be used as carriers of liquid active substances. The foregoing list is intended to be representative of and not in limitation of labile active substances suitable for use in fibrous structures in accordance with the present invention.

In accordance with the invention, after the surrogate particles are immobilized, a functionally effective amount of the labile active substance is deposited on the surrogate particles. The loading of the labile active substance will vary depending upon factors including the intended function and the comparative effectiveness of the labile substance for the intended function. Accordingly, a relatively greater amount of a relatively less effective, labile active substance will be used, whereas a relatively smaller amount of a relatively more effective, labile active substance will be appropriate to obtain comparable functional activity.

In accordance with the invention, the labile active substance is beneficially selectively deposited on the surrogate particles. By "selective" is meant significantly more deposition on the surrogate particles than on other available surface of the fibrous structure. To provide for selective deposition, the surrogate particles may, as mentioned, have physical structure such as pores providing a useful void volume or an irregular surface having surface cavities. Alternatively or in addition, the labile active substance and the surrogate particles may be specifically attractive to one another. Thus, a variety of methods and techniques may be selected from, for the selective deposition, depending upon factors including the basis for the selective deposition, the chemical and physical properties of the labile active substance and the surrogate particles, and the need to maintain the structural integrity of the fibrous matrix. Useful active deposition methodologies include sublimation, grafting, plasma treatment, vapor deposition, electrocharging, electrodeposition, liquid phase deposition, chemical bonding, the use of pressure and/or temperature as the driving force, chemical or physical modification of the surrogate particles, and other suitable techniques. If heat is applied in a deposition methodology, the temperature selected should be less than that at which the desired product including the fibrous matrix, is adversely affected. The deposition should be efficient to minimize loss of the labile active substance.

Depending upon the deposition methodology, the chemical and physical properties of the surrogate particles and labile active substance, and other considerations, the labile active substance may be associated with the surrogate particles in various ways. The labile active substance may be, for example, merely deposited on the surface of, within pores and/or surface cavities of, or on the surface and within pores of the surrogate particles, but in any case not in attractive association with, or bonded or otherwise attached to, the surrogate particles. Associative lability is typically characterized by this limited type of association. Illustrative is a liquid labile active substance deposited in pores and cavities of surrogate particles, or in surface channels of elongated surrogate particles.

The labile active substance may alternatively or additionally be in attractive association with, or physically or chemically bonded or otherwise attached to, the surrogate particles. If chemically bonded, covalent chemical bonding may be an appropriate choice depending upon the surface chemistry, for instance, bonding sites, of the surrogate particles, and the chemistry of the labile active substance. To effect attraction or attachment, the surrogate particles and labile active substance may be chemically or physically modified to be specifically attractive to one another. The attraction or attachment between the labile active substance and the surrogate particles may be reversible so that after the useful service life, the attraction, for instance attractive charges, may be "turned off". Reversibility facilitates recovery and safe disposal of spent labile active substance without affecting the immobilized surrogate particles-fibrous matrix structure. Thereafter, the activity of the fibrous structure may be regenerated by deposition of fresh labile active substance.

Optionally, the fibrous structure may also include particles other than the surrogate particles, for instance, functionally active particles, i.e., particles having a useful function other than as a mere carrier in a fibrous structure. If so, then these particles will typically be immobilized. However, if the fibrous structure includes both these particles and surrogate particles, then in accordance with the invention, the labile active substance will be selectively deposited on the surrogate particles. Thus, by means of a driving force such as a preferential attraction between the surrogate particles and the labile active substance vis-a-vis any attraction between these particles and the labile active substance, the selective deposition will be effected. Accordingly, consistent with the need for selective deposition, the fibrous structure may include these particles. If present, these functionally active particles will typically have a different functional activity than that of the labile active substance.

The labile active substance may be used alone or with another labile active substance. The labile active substance may also be used in combination with a relatively stable or stable active substance or substances having a beneficial effect; if so, the surrogate particles or the just-described, optional particles could serve as the carrier. The relatively stable or stable active substance may produce a useful effect similar to that described for a labile active substance; however, the functional activity will typically differ from that of the labile active substance.

FIG. 1 shows at 20 a sectional view through a non-woven fibrous structure in accordance with the invention. A plurality of individual structural fibers 22 form an open web 24, and define an upper surface 26 and a lower surface 28 of the web. Beneficially, the fibrous matrix of the web is generally uniform and surrogate particles 30 depicted as having rough surfaces, are distributed in a generally uniform, three dimensionally spaced apart arrangement within the web. Optionally deposited within the web structure are functionally active particles 32, illustrated for ease of distinction, as having smooth surfaces. Alternatively, surrogate particles 30 and active particles 32 could be deposited on the web surface only, on the web surface and within the web, or in different locations such as active particles 32 on the web surface and the surrogate particles within the web.

In accordance with the invention, surrogate particles 30 are beneficially immobilized so as to be maintained in the spaced apart relationship. Likewise advantageously immobilized are active particles 32. Attached to surrogate particles 30, but not to particles 32, is a labile active substance, not shown in FIG. 1. Preferential attraction between the labile active substance and the surrogate particles benefits selective deposition. Surrogate particles 30 have pores and cavities which increase the surface area for attractive deposition. Active particles 32 have a different functional activity than that of the labile active substance.

The fibrous structure of FIG. 1 is advantageously dry formed from crimped staple macrofiber. Dry forming, and in particular carding, advantageously provides an open, generally uniform fibrous structure, and thereafter for controlled introduction and spacing of surrogate particles 30 and active particles 32, with accessibility and tortuous paths in the particle-loaded structure for gas or fluid flow. Surrogate particles 30 and active particles 32 are of approximately the same density and volumetric size; thus, the structure of FIG. 1 may be made by adding these particles approximately simultaneously to the fibrous structure. If, on the other hand, the surrogate particles differ significantly in density and/or size from the active particles, the surrogate particles will usually be added separately from the active particles, typically forming separate layers.

Referring to FIG. 2, an alternative embodiment of a representative surrogate particle immobilized in a fibrous framework like that of FIG. 1, is shown. Corresponding numbers designate like parts, and for sake for brevity, details previously described are not repeated. In this embodiment, surrogate particle 30' has pores (represented by dots) and an irregular surface with cavities 40 of varying sizes. In accordance with the invention, deposited in cavities 40 and pores of the surrogate particle, is a labile active substance, designated 8 and for sake of illustration depicted as deposited in the larger cavities. Promoting selective deposition on the surrogate particles vis-a-vis the fibrous matrix, fibers 22' have relatively smooth surfaces compared to the rough surface of the surrogate particles. In this embodiment, the fibrous matrix will typically lack optional particles 32.

Fibers 22' are advantageously sheath/core composite fibers each having a core 56 and a lower melting sheath 58. Surrogate particles are beneficially bonded to the fibers at numerous points 66, the bonding being preferably localized, and fiber-to-fiber bonding at cross over points of the fibers stabilizes the web structure. Likewise, the fibrous web of FIG. 1 is formed of sheath/core composite fibers.

A fibrous structure in accordance with the invention, may have in contact therewith one or more other layers. These layers may be nonwovens including partially densified nonwovens and melt blown webs, woven fabrics, knit fabrics, porous membranes and so forth. These layers may be laminated to or otherwise suitably attached to the inventive fibrous structure, and may exert a useful function if desired.

Uses include filtration such as vehicle cabin air filtration, in-door air filtration, filtration appliances and liquid filtration. Uses include pharmaceutical, medical and biotech processing, food and beverage processing, and blood processing including of whole blood and blood components. Analytical uses include diagnostic testing. The fibrous structures may be used as wall coverings with a sorptive and/or odorizing function. Environmental uses include emissions control. Military, civil defense and police uses exist.

The fibrous media may be used as is, or in various forms including pleated, tubes, pockets (as in pocket filters), blankets, rolls, bags, ducts and ductliners. The fibrous structure may be used singly or in combination with other fabrics, filter media, films, plastics and membranes.

In a beneficial process for making a fibrous structure in accordance with the present invention, a carding machine cards crimped fiber and forms an open nonwoven web on an endless moving belt. Surrogate particles are applied to the web from, for instance, a shaker. The web is open to an appropriate degree and the surrogate particles are of appropriate size and weight to become entrapped in the interior of the web. Then, heat in the form of IR heat, may be advantageously applied to the entire structure under appropriate conditions to provide for adhesion of the surrogate particles to the matrix structure and fiber-fiber bonding. In this way, a fibrous matrix is formed, and thereafter surrogate particles are distributed in a three dimensional arrangement and immobilized.

Other types of immobilization may be used. A heat-bonding step, if used, is carried out at a sufficient elevated temperature less than the melting point of the structural fiber and for a suitable period of time to cause adhesion of the surrogate particles to the structural fiber. The fibrous structure is thereafter cooled.

Thereafter, in accordance with the invention, a labile active substance is added to the surrogate particles/fibrous matrix structure, and is selectively deposited on the surrogate particles. A suitable deposition methodology is selected consistent with the considerations previously described. Accordingly, there is also provided a method by which a fibrous matrix with immobilized surrogate particles is prepared, and thereafter a labile active substance is selectively deposited on the surrogate particles using suitable deposition conditions.

The present invention may be carried out with various modifications without departing from the spirit or essential attributes thereof, and accordingly, reference should be made to the appended claims, rather than to the foregoing specification as indicating the scope of the invention.

We claim:

1. A fibrous structure comprising a fibrous matrix with heat-bonded surrogate particles immobilized in a three dimensional arrangement, and a labile active substance sensitive to heat bonding, post-immobilization deposited on said surrogate particles.

2. The fibrous structure of claim 1, wherein said surrogate particles are porous, and said labile active substance is deposited in the pores of said surrogate particles.

3. The fibrous structure of claim 1, wherein said surrogate particles are porous and have surface cavities, and said labile active substance is deposited in the pores and said surface cavities.

4. The fibrous structure of claim 1, wherein said surrogate particles are elongated and each comprises at least one longitudinally disposed surface channel, and said labile active substance is deposited in said surface channels.

5. The fibrous structure of claim 1, wherein said surrogate particles are selected from the group consisting of carbon particles, zeolite particles, alumina particles, polymeric particles and absorbent particles.

6. The fibrous structure of claim 1, wherein said labile active substance is chemically or physically attractively associated with or attached to said surrogate particles.

7. The fibrous structure of claim 6, wherein the attractive association or attachment between said labile active substance and said surrogate particles is reversible.

8. The fibrous structure of claim 6, wherein said labile active substance is attached to said surrogate particles by chemical bonding.

9. The fibrous structure of claim 1, further comprising particles other than said surrogate particles, these additional particles being active particles.

10. The fibrous structure of claim 1, wherein said three dimensional arrangement is a generally uniform, three dimensionally spaced apart arrangement.

11. The fibrous structure of claim 1, wherein said labile active substance is selected from the group consisting of potassium permanganate, activated manganese dioxide, alkali metal and alkaline earth metal iodates, sorptive organic amines, a substance intended to be released from said surrogate particles, and polyethyleneglycoldimethylether.

12. The fibrous structure of claim 1, wherein said labile active substance is a liquid organic substance.

13. A process for making a fibrous structure comprising a three dimensional arrangement of a labile active substance, said process comprising distributing surrogate particles in a three dimensional arrangement within a fibrous matrix, immobilizing the three dimensionally distributed surrogate particles by heat bonding of said surrogate particles, and after the heat bonding, depositing on said surrogate particles a labile active substance sensitive to the heat bonding.

14. The process of claim 13, wherein said surrogate particles are porous, and said labile active substance is deposited in the pores of said surrogate particles.

15. The process of claim 13, wherein said surrogate particles are porous and have surface cavities, and said labile active substance is deposited in the pores and said surface cavities.

16. The process of claim 13, wherein said surrogate particles are elongated and each comprises at least one longitudinally disposed surface channel, and said labile active substance is deposited in said surface channels.

17. The process of claim 13, wherein said surrogate particles are selected from the group consisting of carbon particles, zeolite particles, alumina particles, polymeric particles and absorbent particles.

18. The process of claim 13, wherein said three dimensional arrangement is a generally uniform, three dimensionally spaced apart arrangement.

19. The process of claim 13, wherein said labile active substance is selected from the group consisting of potassium permanganate, activated manganese dioxide, alkali metal and alkaline earth metal iodates, sorptive organic amines, a substance intended to be released from said surrogate particles, and polyethyleneglycoldimethylether.

20. The process of claim 13, wherein particles other than said surrogate particles are deposited within said fibrous framework, these additional particles being active particles; wherein at least one other layer is disposed on or within said fibrous structure; and wherein said labile active substance is a liquid organic substance.

* * * * *